Figure 1:
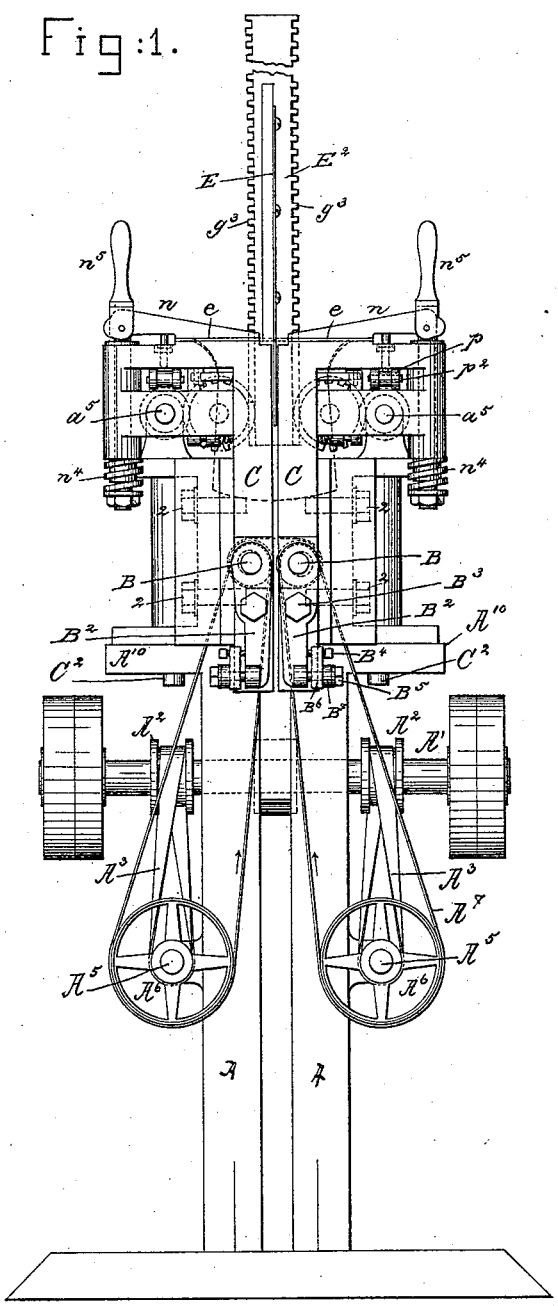

(No Model.)  5 Sheets—Sheet 1.

J. W. D. FIFIELD & W. H. HOLT.
CRIMPING MACHINE FOR BOOTS OR SHOES.

No. 304,517.  Patented Sept. 2, 1884.

Witnesses.  Inventors.

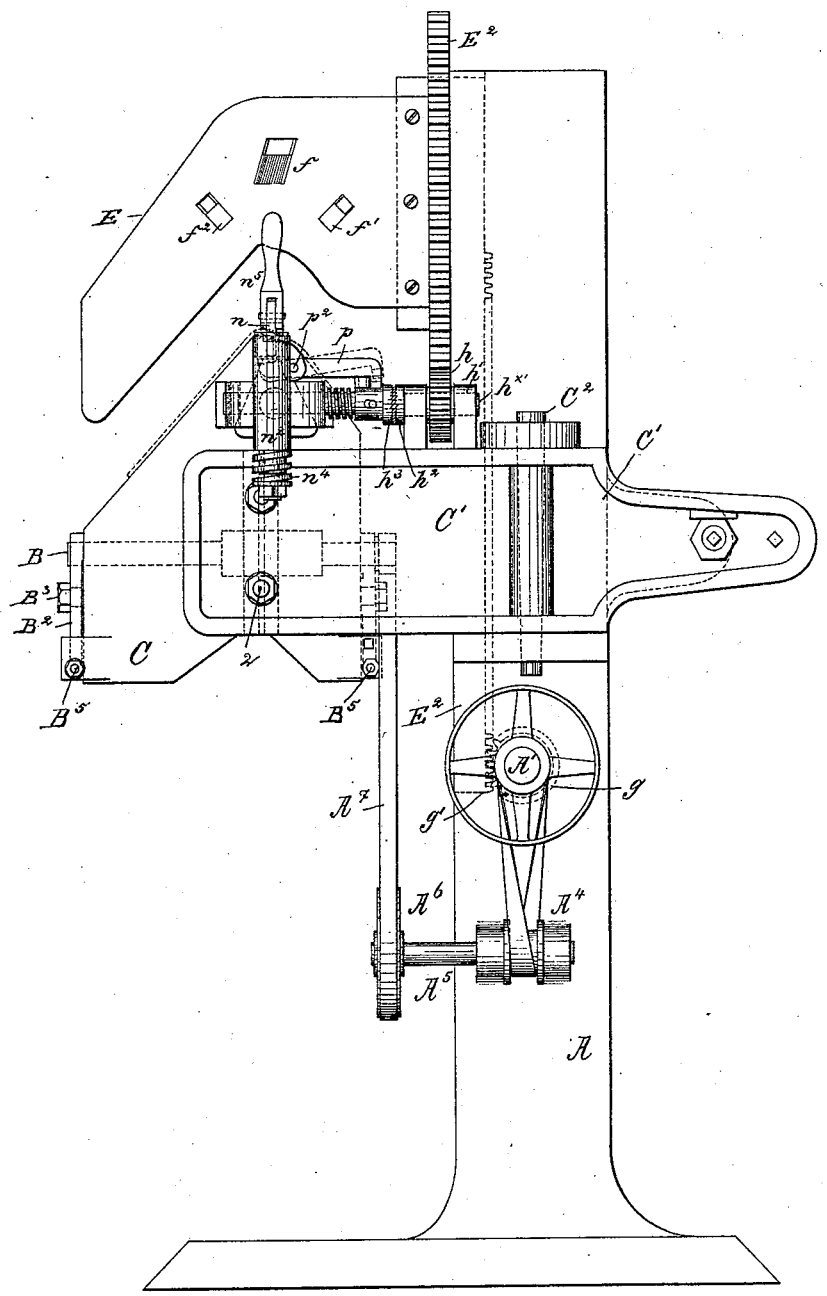

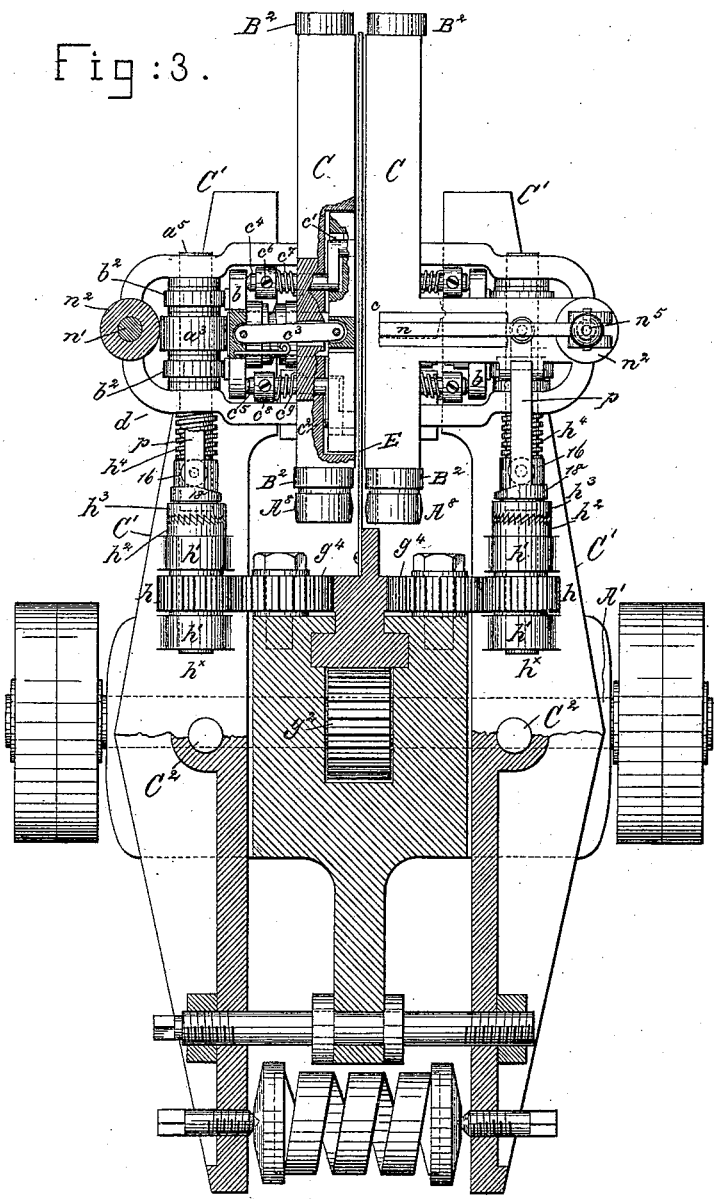

(No Model.) 5 Sheets—Sheet 4.
J. W. D. FIFIELD & W. H. HOLT.
CRIMPING MACHINE FOR BOOTS OR SHOES.
No. 304,517. Patented Sept. 2, 1884.
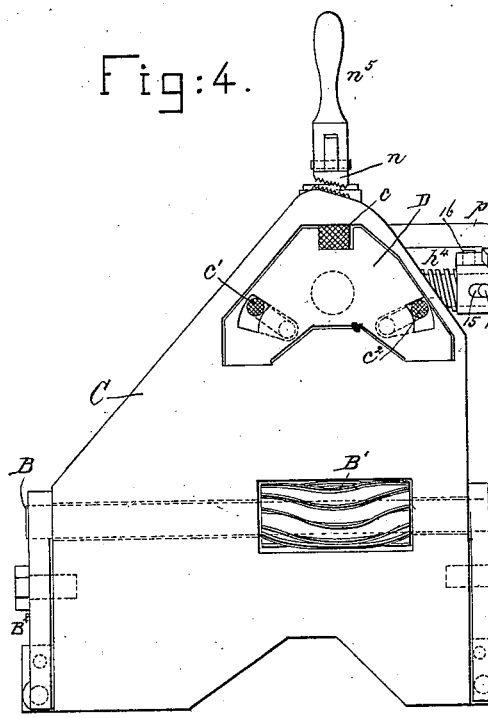
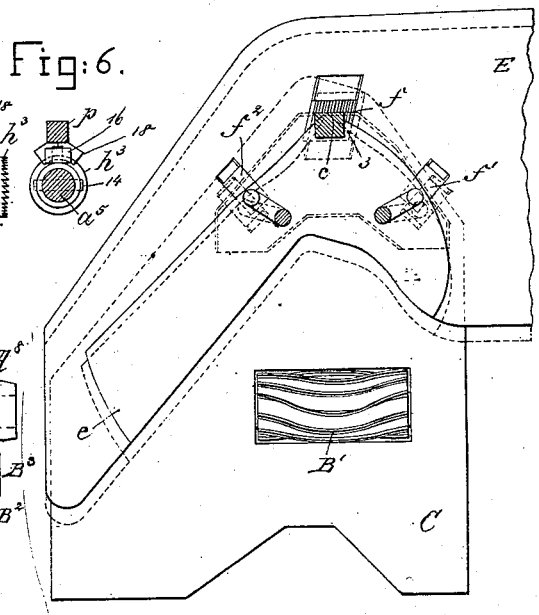
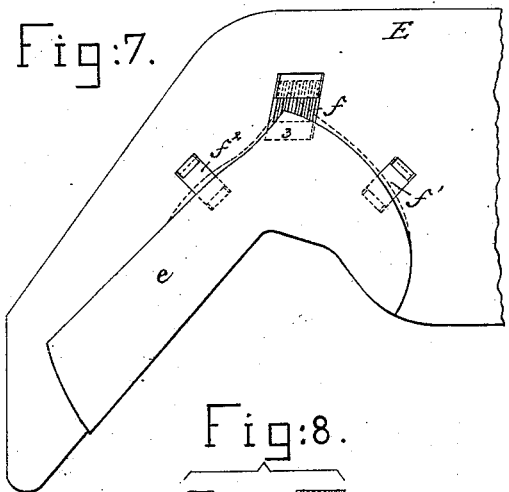
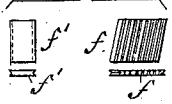
Witnesses.
Arthur Lipperlen.
John F. C. Prinkert.
Inventors.
John W. D. Fifield and
William H. Holt.
by Crosby & Gregory attys.

(No Model.) 5 Sheets—Sheet 5.
J. W. D. FIFIELD & W. H. HOLT.
CRIMPING MACHINE FOR BOOTS OR SHOES.
No. 304,517. Patented Sept. 2, 1884.
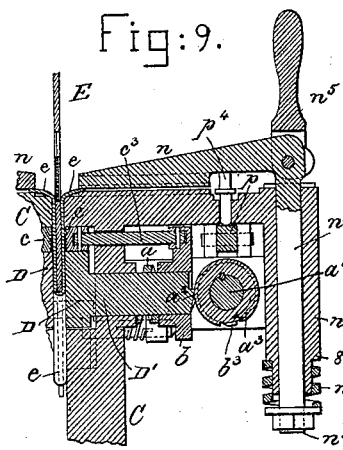
Fig: 9.
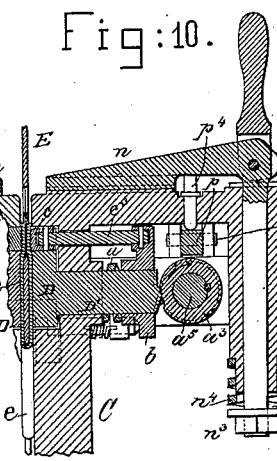
Fig: 10.
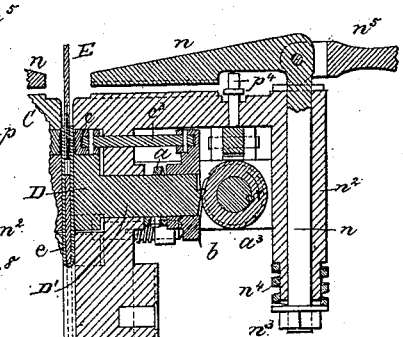
Fig: 11.
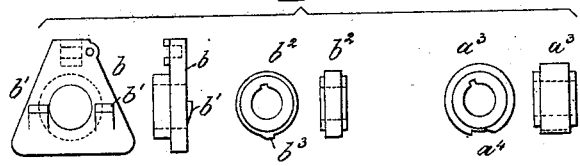
Fig: 12.
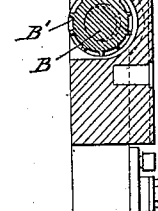
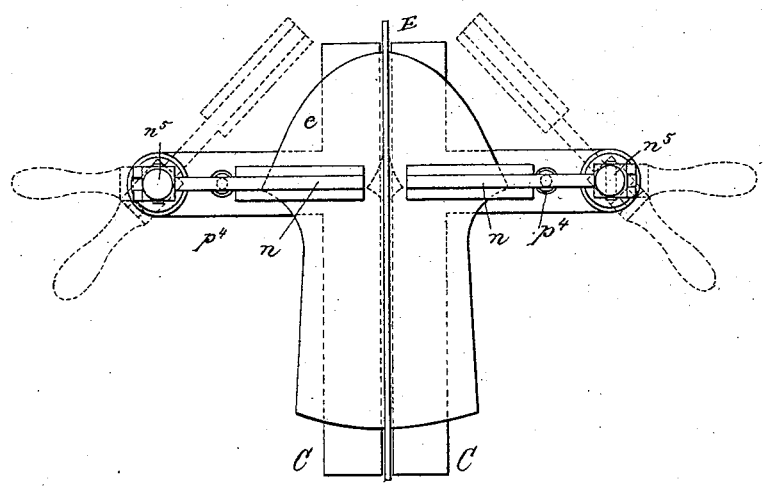
Fig: 13.
Witnesses.
Arthur Lippincott.
John F. C. Prinkert.
Inventors.
John W. D. Fifield and
William H. Holt.
by Crosby & Gregory attys.

UNITED STATES PATENT OFFICE.

JOHN W. D. FIFIELD AND WILLIAM H. HOLT, OF NORTH BROOKFIELD, MASSACHUSETTS, ASSIGNORS TO THE STODDARD CRIMPING MACHINE COMPANY, OF HARTFORD, CONNECTICUT.

CRIMPING-MACHINE FOR BOOTS OR SHOES.

SPECIFICATION forming part of Letters Patent No. 304,517, dated September 2, 1884.

Application filed February 23, 1884. (No model.)

*To all whom it may concern:*

Be it known that we, JOHN W. D. FIFIELD and WILLIAM H. HOLT, of North Brookfield, county of Worcester, and State of Massachusetts, have invented an Improvement in Crimping-Machines for Boots and Shoes, of which the following description, in connection with the accompanying drawings, is a specification, like letters on the drawings representing like parts.

In most crimping-machines now used the vamp is placed upon the jaws, and is forced between them by a movable metallic form-plate, and thereafter the vamp, in the condition left by the machine, is applied to the usual wooden crimping-form, to which it is secured by tacks made especially for such purpose, and the corners of the vamp, seized between usual clamps operated by screws, are drawn so as to be of sufficient size to "cut in," as it is called, after the vamp has been removed from the wooden form and the pattern is laid thereon. This final stretching of the vamp by the clamps engaging its corners acts to form wrinkles across the instep, which have to be subsequently rubbed out by hand. The final stretching of the corners and the rubbing out of the wrinkles has in a measure been obviated by cutting the vamp longer, to leave more stock in the corners; but such practice is not economical.

One important object of our invention is to automatically crimp the vamp and fully stretch it at its corners and adjacent thereto, so as to fit the form and obviate the subsequent application of the vamp to the usual wooden forms. To do this we have provided the jaws with movable corner and leg and foot engaging dogs, and have also provided the form with movable blocks or slides to co-operate with the dogs, the latter, in connection with the said blocks, clamping the upper, and by their movement, independently of the movement of the form-plate through between the jaws, acting to stretch the vamp at the corners and at each side of the same. The dogs are made laterally movable, so as to be pressed against and then to be withdrawn from the vamp, and co-operating with the said dogs to retain the vamp in stretched condition are clamping-plates, made movable out and in with relation to the faces of the jaws, the clamping-plates being moved in opposition to the direction of movement of the dogs in engaging or when retiring from the vamp. It is necessary that these clamping-plates be retracted to release the vamp and permit the dogs, which engage the edges of the foot and leg of the vamp near the corners, to stretch the vamp, the said dogs co-operating with the blocks or slides in the form-plate.

The particular features in which our invention consists will be hereinafter particularly pointed out in the claims at the end of this specification.

Figure 1 is a front end view of a crimping-machine embodying our invention; Fig. 2, a side view thereof; Fig. 3, a partial sectional and top view. Fig. 4 represents the inner face of one jaw and its attached parts. Fig. 5 represents the form-plate with the vamp thereon in full lines ready to be stretched; also a partial view of the inner face of a jaw, together with the dogs and blocks or slides, the dotted lines showing not only the form-plate in a different position, but also the vamp as stretched. Fig. 6 is a detail of gearing, to be described; Fig. 7, another view of the form-plate with a vamp applied thereto, the dotted line showing the position into which the vamp is stretched through the action of the dogs and slides or blocks. Fig. 8 represents the blocks or slides removed from the form-plate. Fig. 9 is a vertical sectional detail of the mechanism for operating the dogs and of the corner-guides for the vamp, the dogs being shown in their backward positions, the clamping-plates in their forward positions, and the form-plate as having been moved partially between the jaws. Fig. 10 is a like section of the same parts in different positions, the dogs being moved in to engage the vamp, while the clamping-plates are retracted. Fig. 11 shows the same parts and more of one of the jaws; but the parts are yet in another position, the corner-guides being lifted. Fig. 12 represents details to be referred to; and Fig. 13 is a detail showing the corner-guides and a vamp laid upon the jaws, ready to be acted upon by the form-plate, or, as it is frequently called, "the follower," the dotted lines showing the corner-guides as thrown around, ready for the application of a vamp to the jaws.

The uprights A support the main shaft A', having two fast and two loose pulleys, to enable it to be driven in one or the other direction to operate the form-carrying rack, or to remain at rest. This shaft A' has two small pulleys, $A^2$, to receive belts $A^3$, which are extended over other small pulleys, $A^4$, on shaft $A^5$, having pulleys $A^6$, provided with belts $A^7$, which are extended over pulleys $A^8$ on the shafts B, carrying the wrinkle-rubbing rollers B', the said shafts B having their journals near each end entered into like bearing-levers $B^2$, pivoted at $B^3$ upon the opposite ends of the jaw C, each lever $B^2$ at its lower end having an attached screw or bolt, $B^5$, which is extended through an ear, $B^6$, secured to the jaw near its lower edge, the said screw or bolt also passing through an india-rubber or other spring, $B^7$, which is interposed between the said ear and the head of the bolt, the said spring acting to keep the rollers B pressed in a yielding manner against the vamp. Each ear $B^6$ also has a set-screw, $B^4$, to limit the inward movement of the rolls B', or the action of the springs $B^7$. The jaws C are connected loosely with the jaw-carrying levers C' by suitable screws, 2, all as usual, so that the jaws may tip or oscillate as on a vertical pivot. The jaw-carrying levers C' are pivoted by bolts $C^2$ in ears $A^{10}$ of the frame A, and the rear ends of the said levers are controlled by bolts and springs, as in United States Patent No. 258,734. Each jaw is cut away at its face near its upper end, (see Fig. 4,) to receive a clamping-plate, D, whose stem D' is extended outward from the jaw through a strong spiral spring, $a$, and loosely through a sleeve, $b$, to be described. The end of the shank has a toe, $a^2$, which is acted upon by a cam, $a^3$, fast upon the shaft $a^5$, and the clamping-plate is pressed outward by the said cam, and its face is kept at the level of the inner face of the jaw at all times, except when the concavity $a^4$ of the cam $a^3$ comes opposite the toe $a^2$, at which time the clamping-plate releases its hold upon the vamp between it and the form-plate E, to be described, which passes the vamp down between the jaws.

The sleeve $b$ at its rear side is provided with two toes, $b'$ $b'$, which are acted upon, respectively, by two cams, $b^2$, having projections or high points $b^3$ and secured to the shaft $a^5$. The projection $b^3$ of the two cams $b^2$ are in line with the space $a^4$ of the cam $a^3$, so that as the clamping-plate D relaxes its pressure against the vamp the sleeve is moved forward toward the vamp. The sleeve has attached to it the corner-engaging dog $c$ and the leg-engaging dog $c'$ and the foot-engaging dog $c^2$. The corner-engaging dog $c$ is joined to the sleeve $b$ by the link $c^3$, but each of the dogs $c'$ $c^2$ form parts of rock-shafts $c^4$ $c^5$, having bearings on the jaws, and provided with collars $c^6$ $c^8$ and springs $c^7$ $c^9$, the latter in engagement with the said collars and jaws, as best shown in Fig. 3, normally acting to hold the dogs $c'$ $c^2$ in their full-line positions, but permitting them when forced inward against the vamp on the descending form-plate to move in the arc of a circle, or from their full to their dotted line positions, Fig. 5, the pressure of the clamping-plates at such time being relaxed from the vamp $e$, in order that the dogs which press it against the blocks or slides $f f' f^2$, grooved at their edges and fitted to slide in the form-plate, may stretch the corners 3 from the full into the dotted line position, Fig. 7, the leg and foot portions of the vamp at each side of the corner being also stretched out, as in dotted lines, Fig. 7, and just before the dogs, they having done their work, are retracted, the clamping-plates are again forced against the form-plate to hold the stretch gained by the dogs as the form-plate continues to descend with the vamp to a point below the jaws, the vamp during such operation being acted upon by the wrinkle-rubbing rollers or devices B'.

The blocks $f$, set into the form-plate to come opposite the corners 3 of the vamp $e$, are held in openings in the said form-plate longer than the blocks, so that the latter, in contact with the vamp at the rear side of the corners 3, slide in the form-plate, as the roughened ends of the stationary dogs $c$ act to press the vamp against the block at its opposite faces. The faces of the blocks $f$ are corrugated in the direction of their length and of the travel of the vamp, so as to prevent the corners 3 from becoming twisted out of shape. The faces of the dogs $c'$ $c^2$ are serrated, as shown in Fig. 4; but as they move in the arc of a circle, and in a different path from that of the blocks or slides $f'$ $f^2$, the faces of the latter are made smoooth to avoid tearing or marring the vamp.

The form-plate E is attached to the vertically-movable form-carrying rack $E^2$, having at its rear side teeth $g'$, which are engaged by the teeth of a gear, $g$, on the main shaft A', by which the said carrying-rack is moved as usual. The carriage-rack $E^2$ is provided at its sides with rack-teeth, as at $g^3$, to engage and rotate the intermediates $g^4$, which in turn engage and rotate the pinions $h$ on the shaft $h^\times$, mounted in bearings $h'$, and provided at their front ends with clutch portions $h^2$. These clutch portions are adapted to be engaged at intervals by clutch portions $h^3$, mounted upon the inner ends of the shafts $a^5$, which carry the cams $a^3$ $b^2$, described, the said clutch parts being connected with the said shafts by pins 14, entered through elongated slots 15 in the tubes of the same, and the said clutch parts $h^3$ are backed up by spiral springs $h^4$. Each clutch part $h^3$ has a cam roll or pin, 16, which is acted upon, as will be hereinafter described, to withdraw the clutch parts $h^3$ from engagement with the rotating clutch parts $h^2$, when it is desired that the shafts $a^5$ remain at rest, which is at all times, except when the pressure of the clamping-plates D is to be released and the dogs are to be pressed forward to engage and stretch the vamp. In practice the shafts make one complete rotation and then stop. The clutch parts are disengaged by the levers $p$, pivoted at $p^2$, and acted upon at their short ends by the pins $p^4$, held loosely in holes in backward extension of the jaws, as shown in Figs. 9 to 11, the said pins being acted upon and depressed by the corner-gages $n$ as the vamp is drawn from under the said corner-gages. As the outer ends of the lever $p$ are elevated or brought into their dotted-line position, Fig. 2, their wedge-shaped ends 18 (see Fig. 4) are lifted above the rolls or studs 16, thus permitting the springs to form the clutch parts $h^2$ into engagement with the moving clutch parts $h^2$, which causes the shafts $a^5$ to be started. The movement of the cams $a^3$ and $b^2$ is so timed with relation to the movement of the form-plate that the pressure of the clamping-plates are relaxed, and the dogs are forced forward to engage the vamp at the proper time and operate as stated.

The corner-gages $n$ have stems $n'$, fitted into sleeves $n^2$, the said stems at their lower ends being provided with nuts $n^3$, on which rest springs $n^4$, which serve to hold the said corner-gages down upon the vamp when the said gages are not held up by their lifting-levers $n^5$. These gages may be turned into the dotted-line position, Fig. 3, to permit a vamp to be placed in proper position upon the jaws under the descending form-plate, and the gages will then be turned into their full-line positions and be lowered upon the vamp at its corner, and the under sides of the said gages are provided with V-shaped teeth or grooves to act upon and prevent the vamp from twisting, thus insuring that the corners shall remain directly opposite each other while the form-plates force the vamp down between the jaws. The upper sides of the jaws directly under the gages are conversely toothed and grooved to match the teeth and grooves of the gages.

We claim—

1. In a crimping-machine, the movable form-plate provided with the slide or block $f$, to come between the corners of the vamp, combined with the jaws and with the corner-engaging dogs to engage the corners of the vamp opposite the slide or block, whereby the corners of the vamp are stretched, substantially as described.

2. The movable form-plate provided with movable slides or blocks $f'\ f^2$ and the jaws, combined with the foot and leg engaging dogs $c^2\ c'$, to operate substantially as described.

3. The form-plate provided with slides or blocks $f'\ f^2$, located thereon, as shown, and the jaws connected with the dogs $c\ c^2\ c'$, to engage the vamp at the corners and at the foot and leg portions thereof, to operate substantially as described.

4. The form-plate, the jaws, and the movable clamping-plates therein, combined with dogs to engage the corners of the vamp at opposite sides of form-plate, the dogs acting to hold the corners of the vamp after the latter pressure of the clamping-plates against the vamp has been released, substantially as described.

5. The jaws, the clamping-plates having shanks provided with projections $a^2$, and the sleeve and the one or more vamp-engaging dogs, combined with shaft $a^5$ and cams $a^3\ b^2$, to operate the clamping-plates and dogs, substantially as set forth.

6. The form-plate, combined with the longitudinally-grooved side or block $f$, combined with the jaws and the dogs $c$, substantially as and for the purpose set forth.

7. The form-plate, the jaws, and the vamp and clamping-plates, combined with the dogs $c$ and with a wrinkle-rubbing device, substantially as described.

8. The jaw C, the movable clamping-plate, and one or more dogs to engage the vamp, and the shaft $a^5$, and cams to operate the said plate and dogs, combined with a clutch mechanism to intermittingly engage and operate the said shaft $a^5$, substantially as described.

9. The jaw, the clamping-plate, the dog or dogs, cams $a^3\ b^2$, shafts $a^5$ and $h$, and clutch parts $h^2\ h^3$ between them, combined with a spring to effect the engagement of the said clutch parts to leave the shaft $a'$ at rest, and with means to disengage the said clutch parts, substantially as described.

10. The form-plate and jaws, combined with the corner-gages grooved and toothed at their under sides to act upon the corners of the vamp, as described, to prevent it from being twisted, and to keep the corners of the crimped vamp opposite each other as the vamp is delivered from the machine, substantially as described.

11. The jaws, the corner-gages, the shafts $h$ and $a^5$ and their attached clutch parts $h^2\ h^3$, the latter provided with a roller or stud, combined with the lever $p$ and with means to move it as the vamp is pulled from under the corner-gage, substantially as described.

12. The form-plate to carry the upper between the jaws, the jaw and the wrinkle-rubbing rollers and their shafts, and movable bearing-levers $B^2$, and means to hold the said levers in a yielding manner and to rotate the said shafts positively, substantially as described.

In testimony whereof we have signed our names to this specification in the presence of two subscribing witnesses.

JOHN W. D. FIFIELD.
WM H. HOLT.

Witnesses:
C. S. LUDDEN,
C. D. STOWE.